United States Patent [19]

Parkins et al.

[11] Patent Number: 5,772,334
[45] Date of Patent: Jun. 30, 1998

[54] FLUID FILM BEARINGS

[75] Inventors: David Walter Parkins; James Keith Martin, both of Milton Keynes, England

[73] Assignee: British Technology Group Limited, London, England

[21] Appl. No.: 732,269
[22] PCT Filed: Apr. 26, 1995
[86] PCT No.: PCT/GB95/00955
    § 371 Date: Oct. 25, 1996
    § 102(e) Date: Oct. 25, 1996
[87] PCT Pub. No.: WO95/29346
    PCT Pub. Date: Jan. 21, 1995

[30] Foreign Application Priority Data

Apr. 27, 1994 [GB] United Kingdom .......... 9408485

[51] Int. Cl.⁶ .............. F16C 32/06; F16C 25/02
[52] U.S. Cl. .............. 384/117; 384/263; 384/267
[58] Field of Search ................ 384/100, 114, 384/117, 119, 247, 261, 263, 267, 306, 308, 309, 312

[56] References Cited

U.S. PATENT DOCUMENTS

| | | |
|---|---|---|
| 1,880,353 | 10/1932 | Michell . |
| 2,480,114 | 8/1949 | Bradbury . |
| 3,899,224 | 8/1975 | Schuller et al. ............... 384/119 X |
| 3,972,572 | 8/1976 | Hohn . |
| 3,975,065 | 8/1976 | Gravelle . |
| 3,984,159 | 10/1976 | Jenness . |
| 4,445,792 | 5/1984 | Trippett . |
| 4,490,054 | 12/1984 | Kimmelaar . |
| 4,636,095 | 1/1987 | Gerling . |
| 4,643,592 | 2/1987 | Lewis et al. . |
| 4,714,357 | 12/1987 | Groth et al. ............... 384/312 |
| 4,815,864 | 3/1989 | Jones . |
| 5,098,000 | 3/1992 | Rumpf et al. ............... 384/247 X |
| 5,102,236 | 4/1992 | Ide ............... 384/103 |
| 5,123,891 | 6/1992 | Nieradka et al. ............... 493/370 |
| 5,360,273 | 11/1994 | Buckman ............... 384/119 X |

FOREIGN PATENT DOCUMENTS

| | | |
|---|---|---|
| 0 586 861 | 7/1993 | European Pat. Off. . |
| 1 450 715 | 8/1966 | France . |
| 2 269661 | 11/1975 | France . |
| 269 588 | 10/1950 | Switzerland . |
| 174042 | 9/1965 | U.S.S.R. . |
| 987157 | 1/1983 | U.S.S.R. ............... 384/247 |
| 721 131 | 12/1954 | United Kingdom . |
| 1 010 547 | 11/1965 | United Kingdom . |
| 1 075 140 | 7/1967 | United Kingdom . |
| 1 251 160 | 10/1971 | United Kingdom . |
| 1 373 429 | 11/1974 | United Kingdom . |
| 1 375 283 | 11/1974 | United Kingdom . |
| 2 109 483 | 11/1978 | United Kingdom . |
| 2 030 658 | 4/1980 | United Kingdom . |
| 2 286 311 | 4/1976 | WIPO . |
| 88/09443 | 12/1988 | WIPO . |
| 93/22575 | 11/1993 | WIPO . |

OTHER PUBLICATIONS

Patent Abstract of Japan, vol. 12, No. 325, (M–737), Sep.5, 1988, & JP,A,63 092814 (Toshiba) Apr. 23, 1988. see abstract.

Patent Abstract of Japan, vol. 5, No. 57, (M–064), Apr. 18, 1981, & JP,A,56 010817 (Toshiba), Feb. 3, 1981. see abstract.

Primary Examiner—Thomas R. Hannon
Attorney, Agent, or Firm—Cushman Darby & Cushman Intellectual Property Group of Pillsbury Madison & Sutro

[57] ABSTRACT

A hydrodynamic fluid film bearing in which a plurality of circumferentially spaced bearing elements are provided, defining areas of support for the rotating part of the bearing. At least some of the bearing elements are adjustable during operation to vary lubrication conditions in the fluid film. The bearing elements are of sufficiently high stiffness that the position of the entire bearing surface of each element is essentially independent of the pressure in the fluid film encountered during operation.

The bearing allows complete control of the lubrication conditions and can be adjusted for optimum performance over a wide range of speed and load.

17 Claims, 4 Drawing Sheets

FLUID FILM BEARINGS

FIELD OF THE INVENTION

The invention relates to fluid film bearings and, more specifically, to hydrodynamic bearings.

BACKGROUND OF THE INVENTION

In the most basic form of hydrodynamic bearing, a journal is rotatably mounted relative to a housing with a small radial clearance therebetween. The axes of the journal and housing are offset by a small distance, such that in operation, when a lubricant at relatively low pressure is introduced via a suitable opening in the housing, the journal exerts a frictional drag on the lubricant drawing it into the wedge-shaped part of the space between the surfaces, and a convergent film is formed. The action of the relatively moving surfaces creates in the convergent film a relatively high pressure zone which holds the surfaces apart.

Establishing a lubricant film of satisfactory thickness is dependent upon a number of different conditions. During operation of such a bearing, factors such as the operating speed and the operating load affect the lubrication conditions and hence the bearing performance. Over the life of the bearing, wear can clearly also affect its performance.

A more recent approach to hydrodynamic bearings has involved the provision of segmental bearings, wherein the bearing surface is formed of a plurality of circumferentially spaced pads. Each pad is supported in the housing for limited pivotal movement and during operation the pad tilts such that the moments acting on it due to the fluid film pressures are in equilibrium.

Examples of this type of bearing construction, known as a 'tilting pad' bearing, are disclosed in U.S. Pat. No 4,714,357, U.S. Pat. No 4,490,054 and U.S. Pat. No 4,636,095.

Although tilting pad bearings have application in a wide variety of different fields, they may exhibit disadvantages particularly at high rotational speeds and when subjected to transverse loads. At high speed, and especially under no-load or low-load conditions, oscillations of the rotating shaft can be significant. Moreover, under transverse loads, there can be considerable changes in the eccentricity of the shaft (the displacement of the shaft axis from that of the housing). Both these effects are the result of the fact that the segmental bearing accommodates oscillations and transverse movement by the pivoting of the tilting pads, and there is no possibility of intervention to control the operation of the bearing apart from the provision of shims to alter the unloaded setting (sometimes known as the 'preload') of the bearing pads, which of course involves decommissioning the bearing to strip it down. Moreover, the load capacity at low speeds, such as at starting-up and slowing-down speeds, is very low, since the hydrodynamic lubricant pressure is low in the fluid film.

A further fluid film bearing arrangement is disclosed in GB-1 010 547, in which a circumferentially-spaced series of bearing elements surrounding a shaft are mounted for limited radial displacement against a linked series of pressure chambers. It is intended that any relative displacements as the shaft vibrates are effectively damped by the fact that each element can find its own equilibrium position, as determined by the balance between the force produced by its associated pressure chamber and the opposing force resulting from the fluid film pressure. This arrangement provides no means of actually controlling the conditions in the fluid film. It can be said that the instantaneous fluid film pressure acts to determine the instantaneous position of the bearing elements.

Another bearing, and the method of its manufacture, is disclosed in GB-1 251 160, in which a plurality of bearing surfaces support a rotating shaft. The bearing surfaces can be radially moved while assembling the bearing, and then fixed in a support ring to set their bearing position. No further adjustment of any type is allowed or envisaged with this bearing.

An alternative form of hydrodynamic sliding bearing and one appropriate specifically to lubrication by a gas, such as air, is known as the foil bearing. In a foil bearing a plurality of flexible bearing foils are mounted pre-loaded against the shaft so as to wrap the shaft and hence create the convergent zones to provide a high pressure supporting gas film which separates the surface of the shaft from the surfaces provided by the foils.

Such a bearing is described in U.S. Pat. No 4,445,792, in which the common preload of all the foils may be adjusted, either as a single action or on a continuous basis, to respond to bearing parameters and alter the bearing stiffness, automatically or otherwise. Although the bearing described in this U.S Patent Specification provides useful adjustment, even during operation, the control afforded over the precise lubrication conditions within the fluid film is very limited, as the flexible foils are mechanically conformal, that is, even if the preload is altered, the low bending stiffness of a foil is such that the form it takes is determined by the balance of forces on the foil. The foil shape therefore depends not just on the preload and the foil initial geometry and material properties, but on the fluid film pressure distribution. The changes in the fluid film thickness due to the radial flexibility of the foils in such a bearing are of similar magnitude or even greater than the thickness of the fluid film itself.

In U.S. Pat. No 4,815,864 a tension foil bearing is described, in which the tension of each of three foils is independently adjustable to alter the shape of the fluid film between the surfaces. In this way the selective adjustment can be used to maintain or shift the centre of rotation of the shaft as desired. Once again, the foils are conformal. The shape of the fluid film is determined by, amongst other factors, flexing of the foil, and this cannot be controlled by selection but is dependent on conditions within the bearing itself, particularly on the oil film pressure. This is, in common with the bearing of U.S. Pat. No 4,445,792, due to the fact that the adjustment is by means of adjustment of a force acting on the fluid film in operation (i.e. the preload or foil tension).

A further design of adjustable segmental bearing is disclosed in SU-A-174 042, which describes a plain bearing having segmental bearing surfaces formed by tabs bendable by means of adjustment and fastening screws located in an outer race. The bearing is a rubbing bearing, the adjustment facility providing a means of compensating for wear.

SUMMARY OF THE INVENTION

In many applications it has been found that existing hydrodynamic bearings do not provide sufficient control on bearing performance over a sufficiently wide range of speed and load conditions, and it is an object of the present invention to provide a bearing in which the lubrication conditions can be controlled in a more satisfactory manner.

According to the invention, there is provided a hydrodynamic bearing having means for supporting a rotating part of the bearing in operation on a film of lubrication fluid, said means comprising a plurality of circumferentially spaced bearing elements having respective bearing surfaces defining areas of support for the rotating part, at least some of the bearing elements being adjustable during operation to vary lubrication conditions in the fluid film, wherein the adjustable bearing elements are of sufficiently high stiffness that the position of the entire bearing surface of a bearing element is essentially independent of the pressure in said fluid film encountered during operation.

By providing the bearing elements of the invention, adjustable during operation, the lubrication conditions can be controlled as desired. At the heart of the invention is the fact that, unlike known adjustable bearings, the bearing elements are designed such that the position of the bearing surface of an element is determined essentially only by the geometry of the surface, which is effectively rigid, and by the degree of adjustment selected. In other words, each adjustable element is immovable other than by selective adjustment, which can be made during operation of the bearing. Such position input to the bearing surface of an element allows complete control of the lubrication conditions to a precision previously unattainable. The adjustment is continuously variable, meaning that there is no lower limit to the increment of adjustment. Unlike foil bearings, the adjustment is by means of a position adjustment rather than a force adjustment.

For comprehensive control over the conditions within the bearing, the adjustable elements may be adjustable independently of one another.

In a preferred form of the invention, each adjustable bearing element is effectively hinged about an axis perpendicular to its principal direction of adjustment. This may be accomplished by way of a true mechanical hinge, but preferably the adjustable bearing element is formed integrally with a part of the bearing relative to which the position of the element is adjustable, the two being connected by a thinned portion which forms the hinge. Further adjustment may be provided by arranging that the position of the hinge is adjustable during operation.

The adjustment means for an adjustable bearing element preferably comprises a support arranged to act on the bearing element, wherein the support dimension in the direction of adjustment can be selectively altered.

If appropriate, each support may comprise two or more support elements which are adjustable independently of each other to provide a further degree of control over the position of the bearing surface of the bearing element. These support elements may be longitudinally, circumferentially, or radially spaced from one another.

A threaded shaft with a tapered portion, the tapered portion engaging the bearing element, may be employed to provide the support. In this case the threaded shaft is mounted in threaded engagement in the bearing such that rotation thereof will advance the tapered portion thereby altering the support dimension.

Alternatively, the support may be provided by a movable wedge shaped member engaging the bearing element.

In one form of the invention, the rotating part of the bearing is a shaft journal mounted for operation within a fixed outer casing, the adjustable bearing elements being mounted on and adjustable relative to said casing. In another form of the invention the arrangement is reversed, the rotating part of the bearing being an external rotor mounted for operation around an inner stator, the adjustable bearing elements being mounted on and adjustable relative to said inner stator. In a further form of the invention, whether the rotating part is a shaft journal or an outer rotor, the adjustable bearing elements may be mounted on and adjustable relative to said rotating part.

The hydrodynamic bearing preferably comprises at least three adjustable bearing elements.

The bearing elements may be adjustable in a radial direction. Additionally, at least one of the adjustable bearing elements may be adjustable with an axial component of movement to provide axial thrust capacity. The invention may also be applied to a thrust bearing, in which the bearing elements are adjustable in an axial direction to support a transverse planar surface of the rotating part of the bearing.

Preferably, the bearing is part of a rotating machine and the position of the adjustable bearing elements is determined automatically by operating conditions of the machine. For this purpose, each adjustable bearing element may be provided with a load sensor and/or a displacement sensor.

BRIEF DESCRIPTION OF THE DRAWINGS

For a better understanding of the present invention, and to show how it may be carried into effect, reference will now be made, by way of example only, to the accompanying drawings, in which.

DETAILED DESCRIPTION OF EMBODIMENTS OF THE INVENTION

Figure 1:
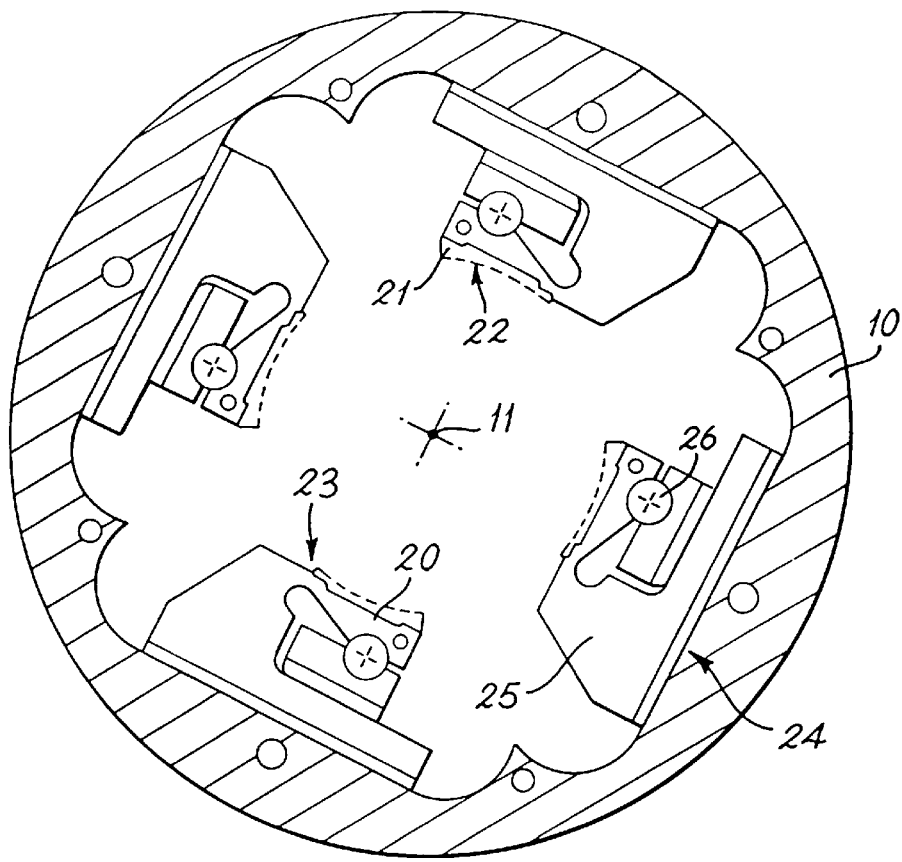
FIG. 1 is a cross section of a bearing in accordance with the invention.

FIG. 1 shows a hydrodynamic bearing having a fixed outer casing 10 and a rotatable central journal (not shown). The bearing has a plurality (four as illustrated) of journal support elements in the form of segmental pads 20 mounted to the outer casing 10 and spaced circumferentially to surround the journal. Each pad is provided with an inner bearing surface 22 of arcuate section. Each pad forms an integral part of a whole bearing component 24, which additionally features a base portion 25 firmly fixed to the outer casing 10. The pad and the base portion are joined by a thinned section 23, such that each pad is effectively hinged to the outer casing 10 by means of the thinned section 23 about an axis parallel to the central axis 11 of the casing 10.

Additionally, an adjustable support 26 is provided between each pad 20 and its base portion 25. The precise location of the adjustable support 26 on the rear side of the pad (the side distant from the bearing surface 22) is not of critical importance, so long as it is arranged such that its adjustment will displace the bearing surface 22 by deflection at the thinned section 23, effectively pivoting the bearing surface around the axis provided by the thinned section 23. In a prototype tested, the support was arranged in a position on the rear side of the pad corresponding to the maximum lubricant film pressure on the bearing surface side of the pad—approximately ⅔ of the arcuate length from the hinge.

The inner bearing surfaces 22 (FIG. 1) are provided on bearing portions 21 of the pads and these bearing portions may be provided by casting a layer of white metal to the surface of the pads and machining the inner surface to the required geometry. In operation, therefore, the inner bearing surfaces 22 of the pads 20, along with the cylindrical outer surface of the rotatable journal, define respective lubrication regions by means of which the journal is supported under fluid pressure for rotation relative to the outer casing 10. Each adjustable support 26 can be independently controllably adjusted without having to dismantle the bearing and while the journal is rotating, i.e. with the bearing in operation. By adjusting a support 26, the convergence of the fluid film between the relevant bearing surface 22 and the journal can be adjusted so as to control the lubrication conditions. Since the pads are of very high stiffness and the supports are not deformable, the position of the entire bearing surface is essentially independent of the fluid pressure in the fluid film and, unlike flexible bearing elements such as foils, this gives control over the operation of the bearing to a degree of precision hitherto unattainable.

For example, by moving one or more pads (such as two diametrically-opposed pads adjusted in a common direction), the central axis of the rotating journal can be offset from the casing central axis 11 to a desired position. Alternatively, or in addition to this control over the journal eccentricity, the overall stiffness of the bearing can be increased by adjusting some or all of the pads in an inwards direction. The adjustment of the positions of the pads can be controlled manually, or remotely. Alternatively it can be controlled automatically by means of a control system providing signals related to the operating conditions. For example, the displacements and/or accelerations of the adjustable supports 26 can be determined by the output of a microprocessor control unit in response to signals representative of the location of the central axis of the journal. In this way a desired position of the axis of rotation can be maintained under all conditions, such as under the transverse loads to which the shaft of a precision machine tool may be subjected, or under conditions of orbital excursions of the axis of the journal which can occur at critical rotational speeds. Alternatively, or in addition, the overall stiffness of the bearing can be controlled by the microprocessor control unit in response to signals representative of the journal speed, to increase the stiffness at critical ranges (such as low speed or through resonance ranges), or in response to signals representative of the measured load (to avoid the instability that might otherwise occur at very low or zero load conditions, particularly at high speeds).

Figure 2A:
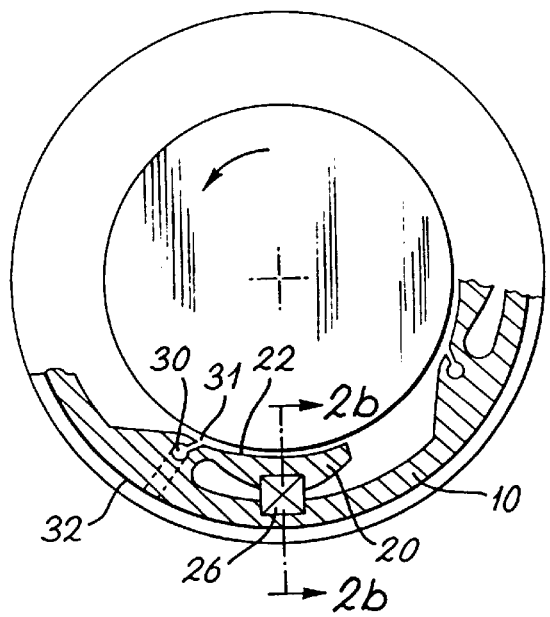
FIGS. 2a and 2b illustrate, in cross section and longitudinal section respectively, a modification to the embodiment of FIG. 1.

The bearing shown in FIG. 1 can be considerably simplified as depicted in FIG. 2a by dispensing with base portion 25 and integrally forming each pad with the casing 10. In the figure, only one of a plurality of bearing pads 20 is illustrated. Axial oil supply passage 30 is shown, arranged to allow injection of an appropriate lubricant such as VG32 mineral oil into the interior of the casing between the journal and the bearing surface 22 by way of a plurality of supply holes 31 separated axially along the leading edge of each converging fluid film wedge. The oil supply passages are fed from a circumferential common oil channel 32. Further openings and channels (not shown), allow the oil, once it has left the clearance spaces, to return to the common channel. It is to be noted that the bearing may thus be self-contained, meaning that it circulates its own lubricant and so requires no external supply. Such lubricant supply arrangements are known per se and their design does not of itself form a part of the invention.

Figure 2B:
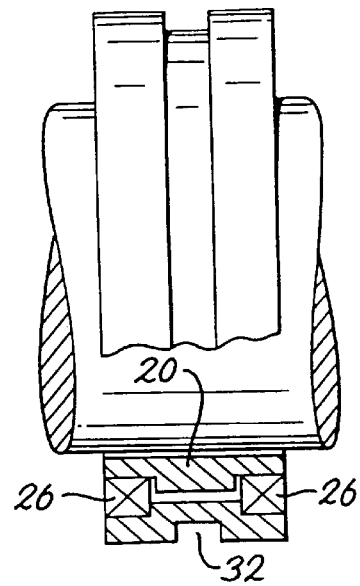

FIG. 2b shows the same arrangement in longitudinal section, and it is to be noted that two axially spaced adjustable supports 26 are provided for each bearing pad 20. The stiffness provided by the use of the two supports allows pads of reduced thickness to be used and this, along with the space saving afforded by the omission of the bearing pad base portions 25, considerably reduces the overall diameter of the bearing required for a journal of given size.

By applying an oscillatory radial motion to the pads 20 via the adjustable supports 26, when oil is present but the journal is not rotating, an oil film may be established in the clearance space and a pressure generated therein. The hydrodynamic pressure so generated maintains separation between the journal and the bearing surface 22 of the pads when the journal is not rotating.

Any number of pads can be used in carrying out the invention, but in order to afford full adjustment of the journal axis, the minimum number is three. The adjustable supports 26 and/or the bearing pads 20 may be provided with load sensors and/or displacement sensors to permit monitoring of the operation of the bearing or, where appropriate, to provide input signals for an automatic bearing control system.

In a prototype bearing tested, the following dimensions and materials were used and found to operate in a satisfactory manner:

| | |
|---|---|
| Journal diameter | 47.6 mm |
| Axial length of pad | 25.4 mm |
| Angle subtended by pad bearing surface | 40° |
| (Arc length 18 mm) | |
| Max. tilt of pad tested | 0.14° |
| (Corresponding to 0.045 mm radial movement at trailing edge) | |
| Oil supply arrangement | 5 jets each of 0.5 mm diameter |
| Materials: Body - Mild steel | |
| Bearing surfaces - White metal. | |

Different forms of adjustable support 26 are possible, provided that the device used accomplishes the desired function, namely a non-resilient displacement of the bearing surface 22. One such device is a shaft with a tapered portion engaging the pad, the shaft mounted in threaded engagement in an appropriate part (not shown) of the outer casing 10 and accessible from outside the casing, such that rotation of the shaft advances (or withdraws) the tapered portion in an axial direction, thereby increasing (or decreasing) the support radial dimension acting on the pad, and hence displacing the pad 20 with respect to the outer casing 10. This device fulfils the desired function in a simple and reliable manner, as it can be arranged to provide a means of adjustment during operation (i.e., whilst the bearing journal is rotating) while ensuring that, once adjusted, the pad is rigidly fixed in position.

Figure 3A:
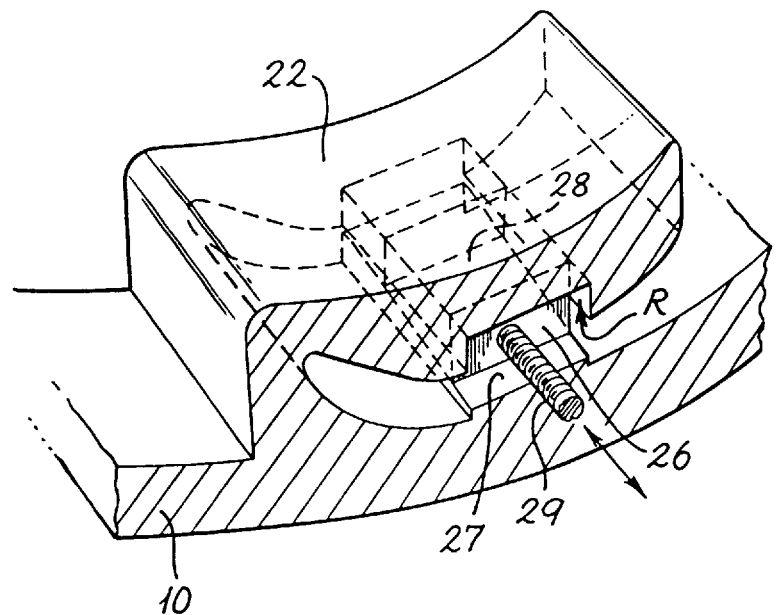
FIGS. 3a and 3b depict one possible form of adjustable support for a bearing element.
Figure 3B:
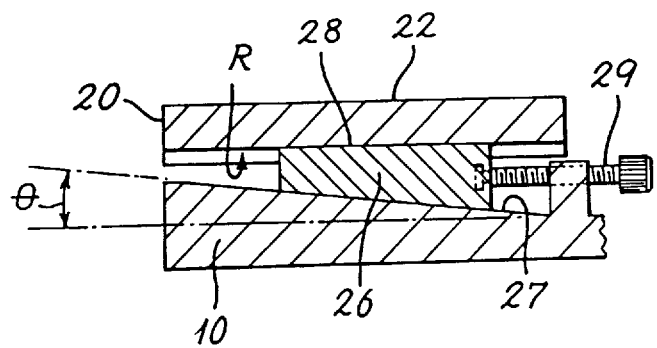

An alternative adjustable support arrangement employing a cooperating wedge arrangement is illustrated in FIG. 3a. The bearing pad 20 is supported on a wedge-shaped support element 26 which is itself supported on a ramp surface 27 provided on the bearing casing 10. The surface 27 and the complementary surface of the support element 26 are planar and disposed at an angle θ to the axial direction as shown. The support element 26 also has a planar support surface 28 to engage with the rear surface of the pad 20. A machined recess R forming a longitudinal track in the rear side of the bearing pad as shown provides a means of reliably locating the support element 26. FIG. 3b shows a sectional view of the adjustable support arrangement. Adjustment is by way of a threaded screw 29 in contact with the support element 26. Rotation of the screw translates the support element in an axial direction relative to the casing, thereby moving support surface 28 in a radial direction and hence adjusting the position of bearing surface 22 of the pad.

Figure 4A:
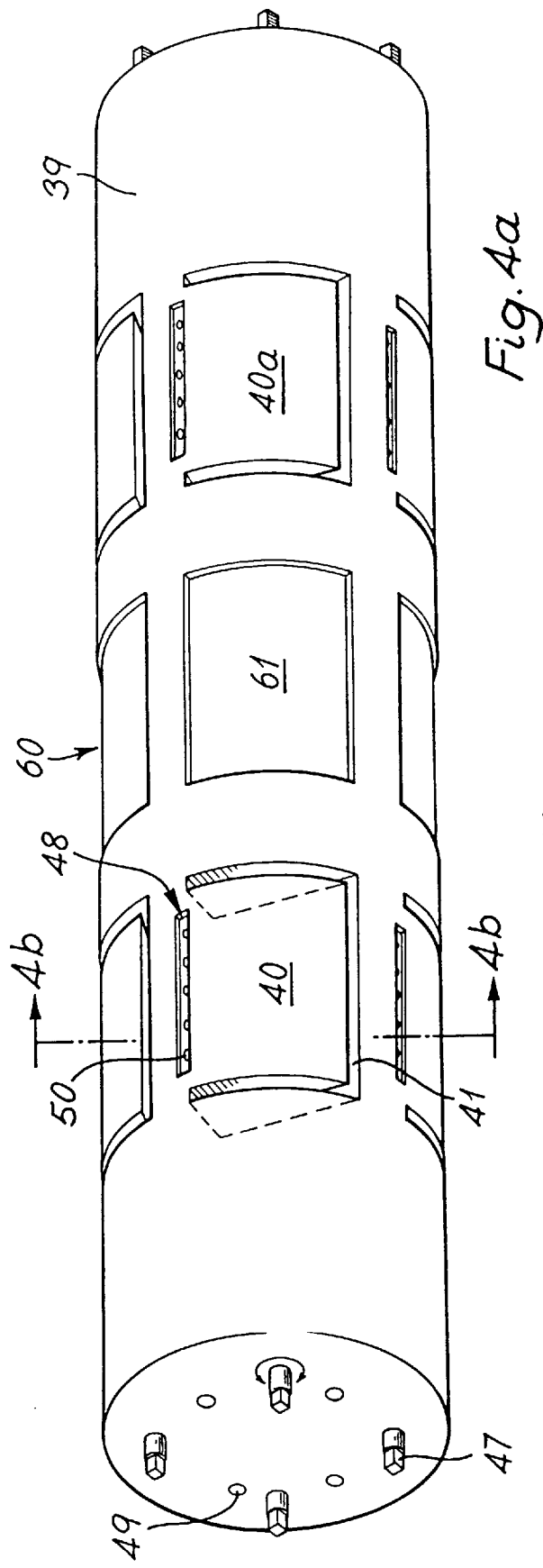
FIGS. 4a and 4b show a bearing in accordance with another embodiment of the invention.
Figure 4B:
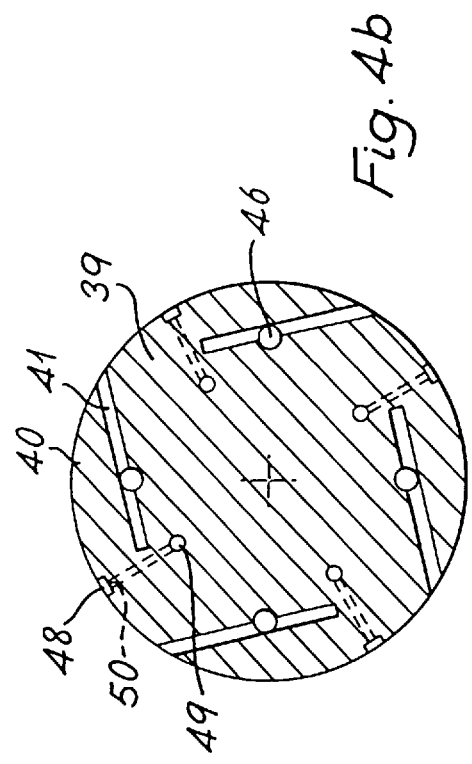

Another embodiment of the invention is shown in FIG. 4a, in which the rotatable part of the bearing is an external rotor (not shown) and the bearing elements are provided on an inner fixed stator 39. The stator is formed from a solid cylindrical piece of metal machined to create the bearing components. FIG. 4b shows the same bearing in cross-section through plane B—B to illustrate the construction.

The bearing has a plurality (four as illustrated) of bearing elements in the form of pads 40 machined from the stator piece by removing appropriate material in a roughly U-shaped groove 41 by an appropriate machining technique, so as to leave pads 40 integral with the stator 39. In a manner similar to that described with reference to the embodiment having an inner rotating journal, adjustable supports 46 are provided to control the position of pads 40. These adjustable supports take the form of shafts with tapered support portions and having longitudinal threaded portions engaged in screw fashion in the stator 39 and adjustable from outside the stator at ends 47. By rotating a shaft the tapered portion is advanced in an axial direction to alter the diameter of the shaft at the support position and so radially displace the pad 40. Also shown are longitudinal shallow grooves 48 machined at the leading edge of each pad to define galleries to which oil can be provided by means of oil supply passages 49 and openings 50. It is to be noted that the entire stator, including all bearing components except for the adjustment shafts, as well as the lubricant transmission means, are integrally formed. Such a design has many advantages over a design involving assembly of a number of different components.

Although only one set of pads is required for realizing this form of the invention, the stator in FIG. 4a features two sets of pads 40 and 40a, axially separated from one another. Centrally between the two sets of pads is a further bearing arrangement, namely a hydrostatic bearing portion 60 comprising four circumferentially spaced approximately rectangular shallow recesses 61. The hydrostatic bearing portion acts in known manner with supply means (not shown) of lubricant under pressure such that upon starting, and until speeds are attained at which the hydrodynamic fluid film is formed between pads 40/40a and the journal, the journal is adequately supported.

The bearing operates in a similar manner to the embodiment having an inner rotating journal. All eight radially displaceable pads 40/40a of the two axially separated sets may be independently adjustable during operation, such that the angular alignment in an axial direction, as well as the eccentricity, of the rotational axis of the rotor may be precisely controlled.

The cross-sectional shape of the pads is shown in FIG. 4b. The displacement of the pads is afforded by the limited resilient flexibility of the material. The material and geometry, though, is such that the shape and position of the bearing surface of a pad is essentially unaffected by changes in the fluid film conditions. Clearly, no material can be completely undeformed by the effects of pressure on its surface. By 'essentially unaffected' is meant that a pad is sufficiently stiff that any change in position of any part of the bearing surface is substantially less than the thickness of the fluid film itself, and this property is common to all embodiments of the invention. A pad is therefore not conformal to the lubrication conditions, as is the case in bearings such as foil bearings. In this way, the mechanical properties of a pad allow it to deflect on operation of an adjustment support 46, and thereby to control the lubrication conditions between the bearing surface and the journal, while these lubrication conditions cannot in turn act to deflect the pad itself. This allows the complete and accurate control required.

Additionally the cross-sectional shape of a pad may be designed to equalise stresses in operation across the pad, without affecting the shape of the bearing surface in operation.

In a prototype tested, the following dimensions and materials were used:

| | |
|---|---|
| Stator diameter | 70 mm |
| Axial length of pad | 25.4 mm |
| Angle subtended by pad bearing surface | 72° |
| Max. radial displacement (at trailing edge) of pad tested | 0.035 mm |
| Materials: Rotor - Mild steel with bearing surface of white metal coating | |
| Stator - Mild Steel | |

Development work on a bearing according to the invention and on a computer model has shown that only very small displacements (tilt angles) are required to accommodate a very large range of operating conditions. The pads may be arranged and mounted to pivot about one edge by means of a true mechanical hinge. Since no material deflection is required of the pads in such a case, they may be of a material of theoretically infinite stiffness. A disadvantage of such an arrangement is increased complexity, particularly as the pad displacement is then not resilient and means must be included to positively return the pad when the radial support dimension is reduced.

The bearing of the present invention has the following advantages over conventional fluid film bearings:

1. The location of the central axis of the rotating member can be adjusted (for example to maintain its position) whilst the bearing is in operation, without stopping rotation. This may be effected on a steady state basis (for example, for different applications of a single machine) or in response to behaviour through a control system.
2. The static and dynamic characteristics (centre eccentricity and centre axis inclination of rotating member, stiffness, damping coefficients) can all be altered whilst the bearing is in operation, without stopping rotation, and if desired under automatic control.
3. It is possible to compensate for the effects of wear thereby to maintain properties throughout the operating life of the bearing.
4. The bearing provides a means of avoiding instability (by adjusting the stiffness and the damping), particularly at low or zero load at high speed.
5. Bearing seals need not have the tolerances conventionally required, as the position of the rotating element relative to the casing/stator can be maintained within much closer limits.
6. The control over the fluid film conditions can reduce the lubricant temperature rise in operation. This and other factors allows operation at higher critical speeds.

It is also possible to provide the adjustable bearing elements on the rotating part of the bearing, be it an inner shaft or an external rotor. Clearly some means must be provided to adjust the bearing during operation, and this means may either be fully contained within the rotating part itself, or may comprise means to pass signals to a control unit contained within the rotating part to remotely adjust the bearing. For example, commutation means may be incorporated in the bearing, or a radio link may be utilised.

In addition to the tilting form of displacement described in the above embodiments, preferred because of the effect such displacement has in increasing/decreasing the convergence of the wedge-shaped fluid film in the clearance space, it is possible to adjust the bearing elements in operation in a linear radial direction, thus not altering the angle between the bearing surfaces, but simply changing the separation therebetween. This may be provided as an alternative to the tilting form of displacement, but it is preferred to combine both forms of displacement by providing radial adjustment of the position of the effective hinge of the tilting bearing element. In this way, both the thickness and the form of the fluid film can be simultaneously or sequentially varied, to provide yet more control over lubrication conditions within the clearance space.

Figure 5:
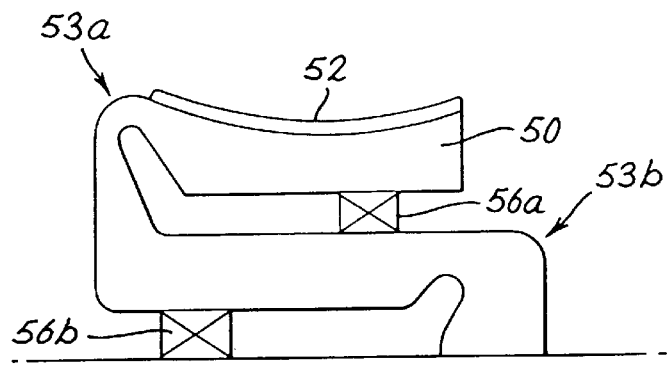
FIG. 5 illustrates an adjustable support arrangement for a bearing element.

An alternative bearing element design is illustrated in FIG. 5, which features two adjustable supports 56a and 56b for each bearing element 50. The bearing element is S-shaped in transverse sectional view as shown, such that two effective hinge portions 53a and 53b are provided and adjustment about each hinge portion is realised by operating the respective adjustable support. By adjusting supports 56a and 56b, both the radial displacement and the tilt angle of bearing surface 52 can be fully controlled over a relatively wide range.

In addition to the above-mentioned form of adjustment, it is possible to arrange the adjustable bearing elements, or pads, such that they can move with an axial component of tilt. In other words, the bearing surfaces of the pads do not remain parallel to the central axis of the part of the bearing on which they are supported. In this way there can be exerted an axial component of fluid film force, to provide a combined journal/thrust bearing. The axial thrust capacity can be employed to resist longitudinal forces on a journal, for example. Alternatively, pads adjustable with an axial component of tilt movement can be used to provide an axial self-centring thrust action for an opposed pair of bearing elements or of sets of bearing elements, such as those shown in FIG. 4a. Adjustment of the bearing elements is still radial, but tilting of the pads can take place about an axis transverse to the central axis of the part of the bearing on which they are supported.

Figure 6A:
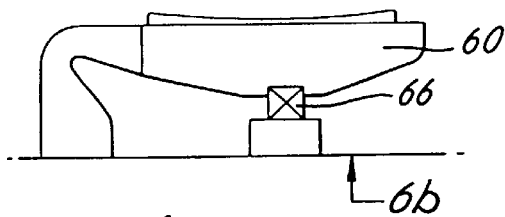
FIGS. 6a and 6b show a modified form of bearing element.
Figure 6B:
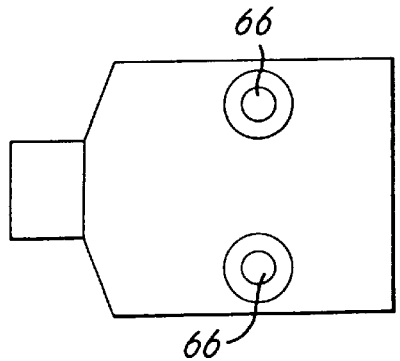

A bearing pad 60 for this purpose is illustrated in FIGS. 6a and 6b. The pad is supported by two axially spaced independently operable adjustable supports 66. The pad is shaped as shown such that differential adjustment of the supports 66 will give an axial component of adjustment by torsional deflection, thus providing a degree of axial bearing capacity. Once again, though, the bearing pads are designed such that once moved into a desired position a pad is fixed there until a subsequent adjustment is selected. The concept may be applied in a conical bearing, where a section of the journal is of frustro-conical form and the bearing elements are disposed to provide a fluid film between their bearing surfaces and the surface of the conical section of the journal.

The invention may also be applied to the hydrodynamic lubrication of thrust bearings, in which a thrust bearing surface operates on a journal mounted collar, for example. Thrust bearings traditionally suffer from the inherent problem that the accuracy to which the perpendicularity of the fluid film abutting surface of the collar can be manufactured and maintained is of similar magnitude to the fluid film thickness. This is due to manufacturing tolerances and to thermal and elastic distortions encountered during operation, and gives rise to what is known as 'swashplate motion'.

One known form of fluid film thrust bearing incorporates a tilting pad arrangement, in which one of the planar sliding surfaces is divided into a number of segments, each free to take up a position at an angle to the opposing surface in order to conform to the hydrodynamic pressure distribution, i.e., according to the speed and loading. According to the invention, these conventional tilting pad bearing elements are replaced by bearing elements adjustable in the axial direction, designed and mounted to be immovable other than by selective adjustment, which adjustment can be made during operation of the bearing. As with the journal bearing, position input to the bearing surface of one of the thrust bearing elements allows precise control over the fluid film conditions and hence over the operation of the bearing. The adjustment of the position of the bearing surfaces of the respective bearing elements can be arranged to minimise or avoid the so-called swashplate motion, and thus increase the reliability of the bearing and reduce the power absorbed. For example, each bearing element can be provided with a load sensor, and the bearing can be arranged with automatic control to afford an equal distribution of the load between all the elements at all times. Additionally or alternatively, the device of the invention can be used to provide adjustability of the axial position of the journal and to enhance the bearing axial stiffness and damping.

Figure 7:
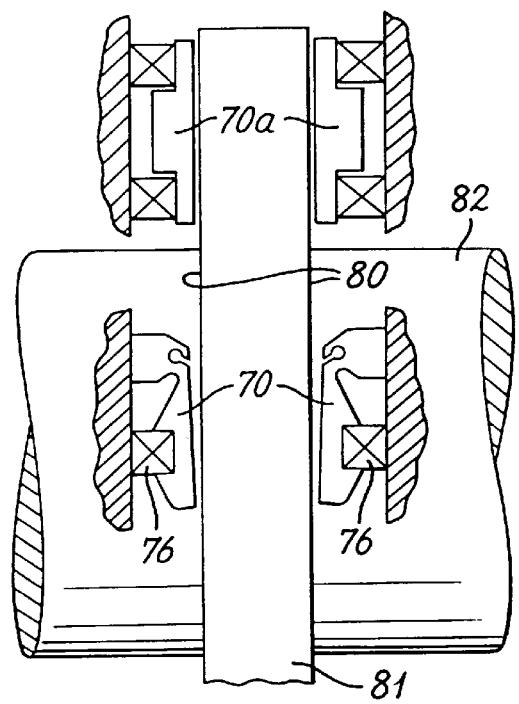
FIG. 7 illustrates the invention applied to a thrust bearing.

FIG. 7 illustrates an embodiment of the invention applied to a thrust bearing, in which bearing pads 70 are adjustable with respect to the transverse planar surfaces 80 of thrust collar 81 which is an integral part of shaft 82. The figure shows bearing pads 70 arranged in opposed pairs, with the respective pads of each pair on opposite sides of the collar 81. The pads are adjustable by way of adjustable supports 76. In this embodiment, four pairs of bearing pads are arranged equally spaced around the circumference of the bearing, and a second of the pairs of pads 70a appears in the illustration. Each pad may be similar in form to those schematically illustrated in FIGS. 6a and 6b, provided with a planar bearing surface. A third adjustable support may be provided for each bearing pad to allow adjustment of the position of the effective hinge, such that independently adjusting the three supports will allow accommodation of the swashplate motion described above.

The adjustable supports 26, 46, 56, 66 and 76 may take many forms, and the two forms already described (axially movable tapered shaft and cooperating wedge arrangement) are only two possible forms. Other possibilities which enable a non-resilient position input include a cam, rotatable to alter the radial or axial support dimension, a piezo-electric element, arranged to undeformably alter its radial or axial dimension in response to an electric charge, and a magneto-restrictive device.

The present invention has many different applications as will be evident to an engineer. For example, there is an ever-increasing demand for more accuracy in the production of components, and the invention will allow precise control in the operation of machine tools used in such production. In particular, the bearing of the invention can be employed in situations where hitherto roller element bearings have been used due to the requirement of very accurate shaft location capability (such as in helicopter transmissions). A significant advantage arises from the fact that a fluid film bearing involves a far greater minimum oil thickness than that of a rolling element bearing, thus reducing the vulnerability of the bearing components to foreign object damage. Studies by the inventors have suggested that the minimum film thickness is 15 times that involved in a rolling element bearing.

Other non-limiting applications of the invention include processing equipment such as printing rollers and handling conveyors, turbines, compressors, pumps, aeronautical and marine engines, gearboxes and other components. The invention is also particularly applicable to machines where large speed ranges are involved.

A gas bearing version may find useful application in environments where avoidance of contamination by lubricant is of great importance, such as in machinery used in the food industry, in computer drive applications, and in the field of gas turbines.

We claim:

1. A hydrodynamic bearing having means for supporting a rotating part of the bearing in operation on a film of lubrication fluid, said means comprising a plurality of circumferentially spaced bearing elements having respective bearing surfaces defining areas of support for the rotating part, at least some of the bearing elements being adjustable during operation to vary lubrication conditions in the fluid film, wherein the adjustable bearing elements are of sufficiently high stiffness that the position of the entire bearing surface of a bearing element is essentially independent of the pressure in said fluid film encountered during operation.

2. A hydrodynamic bearing according to claim 1, wherein the adjustable elements are independently adjustable.

3. A hydrodynamic bearing according to claim 1 or claim 2, wherein each adjustable bearing element is provided with a hinge structure so as to be effectively hinged about an axis perpendicular to a principal direction of adjustment thereof.

4. A hydrodynamic bearing according to claim 3, wherein the adjustable bearing element is formed integrally with a part of the bearing relative to which the position of the element is adjustable, the two being connected by a thinned portion which forms the hinge structure.

5. A hydrodynamic bearing according to claim 3 in which the position of the hinge structure is adjustable during operation.

6. A hydrodynamic bearing according to claim 1, wherein each adjustable bearing element is adjustable by way of a support arranged to act on the bearing element, wherein the support dimension in the direction of adjustment can be selectively altered.

7. A hydrodynamic bearing according to claim 6, wherein each support comprises two or more support elements which are adjustable independently of each other.

8. A hydrodynamic bearing according to claim 6 or claim 7, comprising a threaded shaft with a tapered portion, the tapered portion engaging the bearing element to provide said support, and the threaded shaft being mounted in threaded engagement in the bearing such that rotation thereof will advance the tapered portion thereby altering the support dimension.

9. A hydrodynamic bearing according to claim 6 or claim 7, comprising a movable wedge shaped member engaging the bearing element to provide said support.

10. A hydrodynamic bearing according to claim 1, wherein the rotating part is a shaft journal mounted for operation within a fixed outer casing, the adjustable bearing elements being mounted on and adjustable relative to said casing.

11. A hydrodynamic bearing according to claim 1, wherein the rotating part is an external rotor mounted for operation around an inner stator, the adjustable bearing elements being mounted on and adjustable relative to said inner stator.

12. A hydrodynamic bearing according to claim 1, wherein the adjustable bearing elements are mounted on and adjustable relative to the rotating part.

13. A hydrodynamic bearing according to claim 1 comprising at least three adjustable bearing elements.

14. A hydrodynamic bearing according to claim 1, wherein the adjustable bearing elements are adjustable in a radial direction.

15. A hydrodynamic bearing according to claim 14, wherein at least one of the adjustable bearing elements is adjustable with an axial component of movement to provide axial thrust capacity.

16. A hydrodynamic bearing according to any of claim 1, wherein the bearing is a thrust bearing, the bearing elements being adjustable in an axial direction to support a transverse planar surface of the rotating part of the bearing.

17. A rotating machine incorporating at least one hydrodynamic bearing, each said hydrodynamic bearing having means for supporting a rotating part of the bearing in operation on a film of lubrication fluid, said means comprising a plurality of circumferentially spaced bearing elements having respective bearing surfaces defining areas of support for the rotating part, at least one of the bearing elements being adjustable during operation to vary lubrication conditions in the fluid film, wherein the adjustable bearing elements are of sufficiently high stiffness that the position of the entire bearing surface of a bearing element is essentially independent of the pressure in said fluid film encountered during operation.

* * * * *

UNITED STATES PATENT AND TRADEMARK OFFICE
CERTIFICATE OF CORRECTION

PATENT NO. : 5,772,334
DATED : June 30, 1998
INVENTOR(S) : Parkins, et al.

It is certified that error appears in the above-identified patent and that said Letters Patent is hereby corrected as shown below:

Column 7, line 9, delete "B-B" and replace with --4b-4b--.

Signed and Sealed this

Ninth Day of February, 1999

Attest:

*Attesting Officer*

*Acting Commissioner of Patents and Trademarks*